United States Patent [19]

Chitil

[11] 4,375,982

[45] Mar. 8, 1983

[54] METHOD FOR PURIFYING A DUST-CONTAINING HOT GAS, MORE PARTICULARLY COAL GAS PRODUCED FROM COAL FED INTO A STEEL OR IRON BATH REACTOR

[75] Inventor: Manfred Chitil, Krefeld-Bockum, Fed. Rep. of Germany

[73] Assignee: Klockner-Werke AG, Duisburg, Fed. Rep. of Germany

[21] Appl. No.: 297,256

[22] Filed: Aug. 28, 1981

[30] Foreign Application Priority Data

Oct. 31, 1980 [DE] Fed. Rep. of Germany ....... 3041010

[51] Int. Cl.$^3$ .............................................. C21B 3/04
[52] U.S. Cl. ....................................... 75/25; 266/157; 55/11; 55/135
[58] Field of Search ..................... 55/11, 135, 97, 312; 266/157; 75/25, 48; 34/86

[56] References Cited

U.S. PATENT DOCUMENTS

| 2,002,860 | 5/1935 | Levy | 55/11 |
| 2,171,535 | 9/1939 | Berg et al. | 34/86 |
| 3,389,897 | 6/1968 | Tunder et al. | 55/11 |
| 3,395,512 | 8/1968 | Finney et al. | 55/97 |
| 3,533,739 | 10/1970 | Pelezarski | 23/134 |
| 3,554,515 | 1/1971 | Tonooka et al. | 266/156 |
| 3,731,910 | 5/1973 | Bultler | 266/157 |
| 4,283,223 | 8/1981 | Billard | 55/97 |

FOREIGN PATENT DOCUMENTS

| 486912 | 12/1929 | Fed. Rep. of Germany . | |
| 2520883 | 7/1979 | Fed. Rep. of Germany . | |
| 52-50075 | 4/1977 | Japan | 55/11 |
| 219570 | 7/1924 | United Kingdom . | |
| 937142 | 9/1963 | United Kingdom | 75/48 |

Primary Examiner—Bernard Nozick
Attorney, Agent, or Firm—Watson, Cole, Grindle & Watson

[57] ABSTRACT

Coal gas produced in an iron bath reactor during the gasification of coal is first cooled down in a first cooling step to a temperature of, preferably, 300° C., and is subsequently purified at this temperature in a first electrofilter, then cooled down in a second cooling step to a temperature of, preferably 50° C. and, finally, purified at this temperature in a second electrofilter.

6 Claims, 1 Drawing Figure

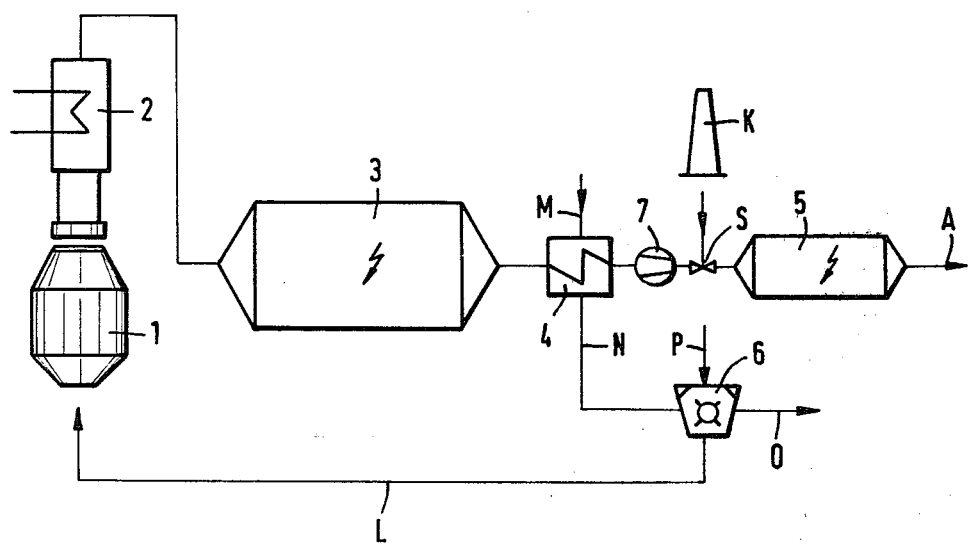

METHOD FOR PURIFYING A DUST-CONTAINING HOT GAS, MORE PARTICULARLY COAL GAS PRODUCED FROM COAL FED INTO A STEEL OR IRON BATH REACTOR

BACKGROUND OF THE INVENTION

This invention relates to a method of purifying a dustcoal fed into a steel or iron bath reactor, and an apparatus operating in accordance with the principles of such method.

The continuous gasification of coal or carboniferous fuels in a steel or iron bath reactor is generally disclosed in U.S. Pat. No. 3,533,739. The coal gas issues from the reactor at a temperature of about 1400° C. and entrains large quantities of dust.

Heretofore, the dust content has typically been reduced to a justifiable extent by means of venturi scrubbers, and could be very high in short and large-size gas pipelines between the producing reactor and the consumer. Such pipelines are easy to clean and the amount of dust that settles out of the streaming gas over short distances is only small. Keeping short and large-size pipelines clean can be done with ease and does not interfere significantly with the operation of the active consumers (power stations, push-type furnaces of a mill train, etc.).

However, if the gas produced through a coal gasification is fed into industrial systems or even into long-distance supply systems, which are now coming into wide usage to safeguard the world's energy supply, large quantities of dust can precipitate given the extended period during which the gas is conveyed from the reactor to the consumer. This precipitation is also facilitated by the fact that the gas stands still in the lines at times, because the withdrawal is not continuous. It is easy to understand that, as a result, the lines of the supply systems can become clogged after a very short time. Another determining factor is the fact that conventional gas supply systems are made up of pipes with small diameters. When coal gases that have been purified in a known manner are introduced, it is unavoidable that the gas supply breaks down because of the clogging of the pipes. However, often it is not possible to clean these pipes, or it can be done only with great difficulty, because of the local conditions.

Problems also arise if gas turbines are operated with the coal gases. The requirement here is that the dust content be less than 5 mg per cm$^3$. Presently, with the venturi dust extractor this limit can be reached only at high cost.

A purifying method is known and described in German Pat. No. 486,912 for purifying hot dust-containing gases, wherein the dust is combustible. According to this method, the hot gas is first cooled, utilizing the heat, and is then purified in an electrofilter. The use of electrofilters for purifying gas is also known and described in British Pat. No. 219,570. However, this known method is not designed for hot gases, so that cooling of the gases being purified is not within the purview of this patent.

SUMMARY OF THE INVENTION

A primary object of the invention is to overcome the drawbacks of the presently known methods for purifying hot dust-containing gases and to provide a low-cost method for purifying coal gas particularly produced with steel or iron bath reactors which, through the use of economical means, results in a practically negligible dust content so that in particular the grain size of the residual dust is so small that it practically cannot settle out but is entrained with the stream of gas. Thus, at best, the dust particles remain in suspension in the gas stream. Furthermore, the residual dust content should preferably be less than 5 mg per cm$^3$ so as to enable gas turbines to operate.

This problem is solved by cooling the hot gas to be purified to about 200° to 500° C., preferably 300° C., causing it to pass at this temperature to a first electrofilter, then cooling it in a second cooling step to about 20° to 80° C., preferably 50° C. and, finally, dedusting it in a second electrofilter at this temperature to a residual dust content which is negligible for gas supply systems or gas turbines.

The selection of the gas temperature after the first cooling step, as well as the selection of the gas temperature after the second cooling step, has a decisive influence on the cost effectiveness of the method embodying the invention. After the first cooling step, the temperature of the coal gas to be purified shall not be too high so that conventional and standard components can be used for the first electrofilter. This first electrofilter essentially adjusts itself to the temperature of the coal gas after the first cooling step. On the other hand, the gas temperature after the first cooling step shall be selected in such a way that the electric dust resistance, which varies with the gas temperature, is not too high. Thus, the gas temperature after the first cooling step is also determined by the type of dust being formed and, therefore, cannot be fixed with precision. Nevertheless, in many tests a gas temperature of 300° C. after the first cooling step has proved very advantageous, because at these temperatures conventional insulators and other materials are used for the electrofilter, while the electric dust resistance is also sufficiently low.

In principle, it would be possible to design the first electrofilter such that in a single step the residual dust content is reduced to the desired value (e.g., below 5 mg per cm$^3$). However, this is not feasible mainly for economic reasons.

For the selection of the gas temperature after the second cooling step, the thermal loading capability of the subsequent electrofilter is no longer of significance. Rather, the determining factor for the temperature selection are practical reasons, particularly a temperature which is sufficiently low for the feed in gas supply systems. Furthermore, the electric dust resistance for the selected temperature should be adequately small.

In principle, it would likewise be possible to cool the coal gas being purified to about 50° C. before entering the first electrofilter. However, this would result in the breakdown of the first heat exchanger after a very brief operating time—if it is not too large—because the quantities of dust being formed excessively reduce the heat transfer in the heat exchanger of the first cooling step after a brief operating time.

With the measures advocated by the invention, it is possible to design the entire system at low cost while at the same time achieving adequate gas purification.

The principles of the invention will be more readily understood by reference to the description of a preferred embodiment in conjunction with the accompanying drawing, which is a diagrammatic sketch of a gas purifier connected to an iron bath reactor.

DETAILED DESCRIPTION OF THE INVENTION

Fine-grained coal is fed via a line L to an iron bath reactor 1 from below by means of a carrier gas, e.g., coal gas or nitrogen. The coal gas issuing at the top from the iron bath reactor 1 has a temperature of about 1500° C. First, it passes through a first convective heat exchanger 2 operating in accordance with the radiation principle and in which the coal gas is cooled to about 300° C. At this temperature, the cooled coal gas passes through a first electrofilter 3, in which most of the dust is separated. At the outlet port of the first electrofilter 3 the coal gas has a dust content of about 50 mg per m$^3$.

The gas is now fed to a second heat exchanger 4, in which the heat is transferred chiefly through heat conduction and in which it is cooled down to about 50° C. The coal gas then passes through a second electrofilter 5, in which the dust content is reduced to about 5 mg/m$^3$. The coal gas issuing from the second electrofilter can then be routed to a gas supply system (not shown). The dust content of the coal gas at point A is sufficiently low to enable gas turbines to be operated with the coal gas.

Nitrogen and air pass in cross flow through the second heat exchanger 4. This nitrogen/air mixture heated in the heat exchanger 4 is fed via a line N to a device 6 designed as a mill and serving to crush and to dry coal and leaving said mill 6 via a line O. Lumpy coal is fed into the mill 6 over a feeding device P. The coal, crushed and dried in the mill 6, is blown via line L from below into the iron bath reactor 1 with a suitable carrier gas, e.g., coal gas. To maintain the stream and to predetermine the throughput, a blower 7 is placed between the second heat exchanger 4 and the second electrofilter 5. Due to the arrangement behind the first heat exchanger 3, the blower 7 is kept practically free from dust.

Finally, a changeover valve S is provided between the blower 7 and the second electrofilter 5. For normal coal gas production in the iron bath reactor 1 it connects the blower 7 with the second electrofilter 5 so that the coal gas produced is fed into a gas supply system. However, as soon as slag must be chipped off in the iron bath reactor 1, or a new charge is placed, or the iron bath reactor 1 does not function normally for other reasons, the changeover valve S is actuated in such a manner that the gases being formed are now fed to a fireplace K for firing. Thus, by means of the changeover valve S it is possible to prevent low-grade coal gas from being fed into the gas supply system, which is connected at point A.

Obviously, many modifications and variation of the present invention are made possible in the light of the above teachings. It is to be therefore understood that within the scope of the appended claims the invention may be practiced otherwise than as specifically described.

What is claimed is:

1. In a method of purifying a hot dust-containing coal gas produced from coal fed into a steel or iron bath reactor and issuing therefrom at a termperature of about 1500° C., the improvement comprising the steps of cooling down the gas to be purified to a first temperature of about 200° to 500° C., first purifying the gas at said first temperature in a first electrofilter, further cooling down the purified gas to a second temperature of about 20° to 100° C., and thereafter again purifying the gas at said second temperature in a second electrofilter for dedusting the gas to a residual dust content which is negligible for a gas piping system.

2. The method according to claim 1, including the further step of first drying the coal being fed into the reactor by using the heat removed when the purified gas is cooled down to said second temperature.

3. In the method according to claim 1, wherein said first temperature is 300° C.

4. In the method according to claim 1, wherein said second temperature is 50° C.

5. In the method according to claim 1, wherein the gas during said first purifying step has a dust content upon entering said first electrofilter in excess of 50 mg/m$^3$ and has a dust content upon exiting said first electrofilter of about 50 mg/m$^3$.

6. In the method according to claim 4, wherein said gas has a dust content upon exiting said second electrofilter of below 5 mg/m$^3$.

* * * * *